United States Patent
Milne et al.

[11] Patent Number: 6,049,742
[45] Date of Patent: Apr. 11, 2000

[54] PROJECTED SUPPLY PLANNING MATCHING ASSETS WITH DEMAND IN MICROELECTRONICS MANUFACTURING

[75] Inventors: Robert J. Milne, Jericho; John P. O'Neil; Robert A. Orzell, both of Essex Junction, all of Vt.; Xueqing Tang, Naperville, Ill.; Yuchung Wong, Silver Spring, Md.

[73] Assignee: International Business Machines Corporation, Armonk, N.Y.

[21] Appl. No.: 08/938,764

[22] Filed: Sep. 26, 1997

[51] Int. Cl.[7] .................................................. G06F 19/00
[52] U.S. Cl. ............................. 700/99; 700/90; 700/97; 705/7; 705/8; 705/28
[58] Field of Search ......................... 700/95, 97, 90, 700/99, 100–213; 705/7, 8–28

[56] References Cited

U.S. PATENT DOCUMENTS

| | | | |
|---|---|---|---|
| 5,260,868 | 11/1993 | Gupta et al. | 364/402 |
| 5,548,518 | 8/1996 | Dietrich et al. . | |
| 5,787,000 | 7/1998 | Lilly et al. | 364/468.01 |
| 5,796,614 | 8/1998 | Yamada | 364/468.13 |

OTHER PUBLICATIONS

Lankford, R., "Scheduling the Job Shop," Proceedings of the Sixteenth Annual Conference of the American Production and Inventory Control Society. (1973).

Lankford, R. "Short–Term Planning of Manufacturing Capacity," Proceedings of the Twenty–First Annual Conference of the American Production and Inventory Control Society. (1978).

Primary Examiner—William Grant
Assistant Examiner—Sheela S. Rao
Attorney, Agent, or Firm—Whitham, Curtis & Whitham; Richard M. Kotulak

[57] ABSTRACT

A computer-implemented decision-support tool serves as a solver to generate a projected supply planning (PSP) or estimated supply planning (ESP) match between existing assets and demands across multiple manufacturing facilities within the boundaries established by the manufacturing specifications and process flows and business policies to determine what supply can be provided over what timeframe by manufacturing and establishes a set of actions or guidelines for manufacturing to incorporate into their manufacturing execution system to ensure that the delivery commitments are met in a timely fashion. The PSP or ESP tool resides within a data provider tool that pulls the required production and distribution information. PSP matching is driven directly by user-supplied guidelines on how to flow or flush assets "forward" to some inventory or holding point. After the supply plan is created, the analyst compares this plan against an expected demand profile.

7 Claims, 6 Drawing Sheets

PROJECTED SUPPLY PLANNING MATCHING ASSETS WITH DEMAND IN MICROELECTRONICS MANUFACTURING

CROSS-REFERENCE TO RELATED APPLICATION

This application incorporates by reference the subject matter of U.S. Pat. No. 5,971,585, by G. Dangat, A. Gokhale, S. Li, R. Milne, R. Orzell, R. Reid, X. Tang, and C. Yen for "Best Can Do Matching of Assets with Demand in Microelectronics Manufacturing" (IBM Docket BU9-96-194). The foregoing patent application is assigned to a common assignee herewith.

DESCRIPTION

Background of the Invention

Field of the Invention

The present invention generally relates to computer-implemented planning resources and decision-support tools and, more particularly, to a tool in which core production planning information is provided to a solver which generates a feasible projected supply plan (PSP) that meets user guidelines. The invention generates an intelligent PSP match between existing assets and demands across multiple manufacturing facilities within the boundaries established by the manufacturing specifications and process flows and business policies.

Background Description

Within the complexity of microelectronics and related manufacturing, four related decision areas or tiers can be distinguished based on the time scale of the planning horizon and the apparent width of the opportunity window. To facilitate an understanding of the four decision tiers in semiconductor manufacturing, we will reference the following oven example. FIG. 1 is a diagram associated with this example.

Within a zone of control 10, there is a coater machine 12, a work-in-progress (WIP) queue 14, and an oven set 16. Wafers move around the zone of control in groups of twenty-five called a lot. All wafers in the lot are the same type. Each lot must pass through the oven operation ten times. Each oven set is composed of four ovens or tubes 161, 162, 163, and 164 and one robot 166 to load and unload the oven. It takes about ten minutes to load or unload an oven. The process time in the oven depends on the iteration. We will assume one lot to an oven at a time. Before a wafer enters into the oven it must be coated by the coater machine 12. The coating process takes twenty minutes. The coating expires in four hours. If the coating expires, the wafer must be stripped, cleaned, and recoated. This process takes four hours and often generates yield losses.

The first decision tier, strategic scheduling, is driven by the time frame or lead time required for business plan, resource acquisition, and new product introduction. This tier can often be viewed in two parts; i.e., very-long-term and long-term. Here, decision makers are concerned with a set of problems that are three months to seven years into the future. Issues considered include, but are not limited to, what markets they will be in, general availability of tooling and workers, major changes in processes, changes in or risk assessment of demand for existing product, required or expected incremental improvements in the production process, lead times for additional tooling, manpower and planning.

In the oven example of FIG. 1, very-long-term decisions are made on whether the ovens are necessary to the production process, and if so, the characteristics needed in the oven. Long-term decisions are made about how many ovens to buy. Tools typically used in planning of this scope are models for capacity planning, cost/pricing, investment optimization, and simulations of key business measures.

The second tier, tactical scheduling, deals with problems the company faces in the next week to six months. Estimates are made of yields, cycle times, and binning percentages. Permissible substitutions are identified. Decisions are made about scheduling starts or releases into the manufacturing line (committing available capacity to new starts). Delivery dates are estimated for firm orders, available "outs" by time buckets are estimated for bulk products, and daily going-rates for schedule-driven products are set. The order/release plan is generated/regenerated. Reschedules are negotiated with or requested by the ultimate customer.

In the oven example of FIG. 1, decisions would be made on the daily going rate for different products, allocation of resources between operations, the number of operators to assign, and machine dedication. Tools typically used in the planning and scheduling of this phase are forward schedulers, fast capacity checkers, and optimization of capacity, commits and cost.

The third tier, operational scheduling, deals with the execution and achievement of a weekly plan. Shipments are made. Serviceability levels are measured. Recovery actions are taken. Optimized consumption of capacity and output of product is computed. Tools typically used in support of daily activities are decision support, recovery models, prioritization techniques and deterministic forward schedulers. Manufacturing execution systems (MES) are used for floor communications and control.

In the oven example of FIG. 1, priorities would be placed on each lot arriving at the ovens, based on their relevance to current plan or record. If the ovens "go down" their priority in the repair cue would be set by decisions made in this tier.

The fourth tier, dispatch scheduling or response system, addresses the problems of the next hour to a few weeks by responding to conditions as they emerge in real time and accommodate variances from availability assumed by systems in the plan creation and commitment phases. Essentially, they instruct the operator what to do next to achieve the current goals of manufacturing. Dispatch scheduling decisions concern monitoring and controlling of the actual manufacturing flow or logistics. Here, decisions are made concerning trade-offs between running test lots for a change in an existing product or a new product and running regular manufacturing lots, lot expiration, prioritizing late lots, positioning preventive maintenance downtime, production of similar product to reduce setup time, down-stream needs, simultaneous requests on the same piece of equipment, preferred machines for yield considerations, assigning personnel to machines, covering for absences, and reestablishing steady production flow after a machine has been down.

In the oven example of FIG. 1, the question is which lot (if any) is run next when an oven is free. Tools used are rule-based dispatchers, short-interval schedulers and mechanical work-in-progress (WIP)-limiting constructions.

Of course, there is overlap and interaction between the four decision tiers but, typically, different groups are responsible for different scheduling decisions. For example, maintenance may decide on training for their personnel, on work schedules for their people, preventive maintenance, and what machine to repair next. Finance and each building superintendent may make decisions on capital equipment purchases. Industrial Engineering may have the final say on total manpower, but a building superintendent may do the day-to-day scheduling. Marketing may decide when orders for products can be filled and what schedule commitments to make. For strategic and operational decisions, these groups and their associated decision-support tools are loosely coordinated or coupled. Finance only requires an estimate of required new tools from each building to estimate capital purchase. Each building requires an estimate on new tool requirements from the product development people. For dispatch decisions, they must be tightly coupled. Lots only get processed when the appropriate tool, operator, and raw material are available. At dispatch, rough estimates are no longer sufficient. If a machine is down, maintenance must have the appropriately-trained individual available to repair the machine. Manufacturing must have the appropriate mix of tools and workers to produce finished goods on a timely basis. At dispatch, the decisions made by various groups must be in sync or nothing is produced. A manufacturing facility accommodates this tight coupling in only one of two ways: slack (extra tooling and manpower, long lead times, limited product variation, excess inventory and people, differential quality, brand loyalty, and so forth) or strong information systems to make effective decisions.

Within the first, second and third decision tiers, a major planning activity undertaken by microelectronic firms is matching assets with demands. This activity can be broken into three major types of matching that are used throughout the microelectronics industry to support decision making:

(a) Material Requirements Planning (MRP) type of matching—"Opportunity Identification" or "Wish list." For a given set of demand and a given asset profile, what work needs to be accomplished to meet demand.

(b) Projected or Estimated Supply Planning (PSP/ESP). Given a set of assets, manufacturing specifications, and business guidelines this solver creates an expected or projected supply picture over the next "t" time units. The user-supplied guidelines direct how to flow or flush assets "forward" to some inventory or holding point.

(c) Best Can Do (BCD). Given the current manufacturing condition and a prioritized set of demands, which demands can be met in what time-frame. BCD generally refers to a large set of demands. A preferred BCD is described in U.S. Pat. No. 5,971,585.

Arguably, the oldest type of matching is material requirements planning (MRP). MRP is a system for translating demand for final products into specific raw materials and manufacturing activity requirements by exploding demand backwards through the bill of materials (BOM) and assets. Many authors have published papers and books on MRP. For example, Joseph Orlicky wrote *Material Requirements Planning*, published by McGraw-Hill, which has become a standard reference. As practiced in the microelectronics industry, MRP systems operate at a specific part number and inventory holding point level of detail.

The difficulty with traditional MRP was it did not provide (a) an estimate about which demand would be met when insufficient resources were available, (b) how to prioritize manufacturing activity in light of insufficient resources, and (c) an estimated feasible, but intelligent, supply plan for some time horizon. Essentially, MRP enabled the manufacturer to identify what needed to be done to meet all demands, but did not provide a realistic estimate of supply.

To overcome these limitations, applications were developed to support BCD and projected supply planning (PSP).

Within the microelectronics industry, especially the semiconductor portion, the early PSP only operated on aggregate production-specification information in large time buckets using simple spreadsheet or matrix-based algorithms to approximate the forward flow of assets through the manufacturing facility. Some of the glaring weaknesses included in these PSP tools are failure to use the same detailed and complete manufacturing specification information used by MRP, failure to use the same level of time-granularity and shutdown-day-control as MRP, incomplete controls over the forward flow of assets, no supply-chain analysis explanation features, and limited ability to aggregate, disaggregate, and/or propagate starts.

The core business function supported by the present invention is generating an estimated or projected supply planning (PSP) match between existing assets and demands across multiple manufacturing facilities within the boundaries established by the manufacturing specifications and process flows and business policies to determine what supply can be provided over what time-frame by microelectronics (wafer to card) or similar (for example, disk drives) manufacturing and establishes a set of actions or guidelines for manufacturing to incorporate into their manufacturing execution system to ensure that the delivery commitments are met in a timely fashion. The matching takes into account manufacturing specifications and business guidelines. Build options, BOM, yields, cycle times, capacity, substitutions, binning, inventory policy, and supplier preferences are date effective. The business function of matching assets with demands falls into the first, second and third decision tiers. The present invention is therefore the tool which serves as the solver to create the PSP match.

SUMMARY OF THE INVENTION

It is therefore an object of the present invention to provide a computer-implemented decision-support tool serving as a solver to generate a projected supply plan (PSP) or estimated supply plan (ESP) match between existing assets and demands within the boundaries established by the manufacturing specifications and process flows and business policies to determine what supply can be provided over what time-frame by microelectronics (wafer to card) or similar (for example, disk drives) manufacturing and establish a set of actions or guidelines for manufacturing to incorporate into their manufacturing execution system to ensure that the delivery commitments are met in a timely fashion.

It is another object of the invention to provide a projected supply planning tool which uses the complete manufacturing specification information used by MRP matching tools to ensure synchronization between these matching tools.

It is another object of the invention to provide the user the ability to dynamically control the forward flow of starts and WIP through the manufacturing process through the user guidelines called from/to fractional splits.

It is another object of the invention to provide the user the ability to specify substitutions between part numbers that are executed as a pre-processing step and after each implode iteration of the forward flush solver.

It is another object of this invention to permit the user to plug and play the components of the PSP tool that are required for his or her business situation.

It is another object of the invention to provide the user the ability to propagate starts for user-defined time buckets into daily buckets prior to executing the forward-flush algorithm which creates the projected supply plan.

It is another object of the invention to provide the user the following enhanced explanation features: a list of all intermediate starts, a list of all stock distributions, and a list of the capacity consumed for each manufacturing activity.

It is another object of the invention to provide the user the ability to take a projected supply plan in daily buckets and aggregate it into user-defined time buckets.

Assets include, but are not limited to, starts, WIP (work in progress), inventory, purchases, and capacity (tooling and manpower). Demands include, but are not limited to, firm orders, forecasted orders, and inventory buffer. The matching must take into account manufacturing specifications and business guidelines. Manufacturing specifications and process flows include, but are not limited to, build options, BOM (bill of material), yields, cycle times, receipt dates, capacity consumed, capacity available, substitutions, binning or sorting, and shipping times. Business guidelines include, but are not limited to, frozen zones, demand priorities, priority trade-offs, preferred suppliers, and inventory policy. Build options, BOM, yields, cycle times, capacity, substitutions, binning, inventory policy, and supplier preferences are date effective.

Different than MRP or BCD matching, PSP or ESP matching is driven directly by user-supplied guidelines on how to flow or flush assets "forward" to some inventory or holding point. After the supply plan is created, the analyst compares this plan against an expected demand profile. Typically, the demand profile and the supply plan are aggregated both by product type and time buckets for comparison purposes. After the comparison is made, the user can reset the guidelines, alter the START or receipts, and/or modify product specifications (for example, yield or cycle time) and rerun the PSP algorithm to generate a new projected or estimated supply. Historically, PSP tools used very simple and incomplete single-path production-specification information and large time buckets in a grid or tabular format to crudely estimate supply. Additionally, there was no synchronization with the detailed product information used by the MRP tool(s).

The preferred embodiment of the invention has seven major components:

(a) A file which contains user guidelines to direct the forward flush or implode of STARTS and WIP through the product structures. The primary guidance required is "from/to." When a part comes to stock, the user must specify what percentage or fraction is allocated to each of the possible paths the part may take next. The fraction is date effective. This tool automatically identifies all user decisions required and simply prompts the user for the fraction or percentage.

(b) A mechanism to modify the current WIP or receipts.

(c) A mechanism to input STARTS.

(d) An implode or "forward-flush" algorithm that generates a feasible (capacity and time) plan engine, based on the user-supplied guidelines, the product and distribution information, and the substitution information.

(e) A post-processing routine which generates solution explanation reports.

(f) A post-processing algorithm that creates and an aggregated supply plan.

(g) User-selected routines to compare the projected supply with the required demand. The ability of the PSP or ESP tool to handle all of the complexities of the semiconductor manufacturing process and the synergy between the components ensures each manufacturing entity can configure the tool to best meet their requirements.

The PSP tool resides within a data provider tool that pulls the required production and distribution information (manufacturing specifications, asset status, and business policy) from various legacy systems and stores them in the required format.

BRIEF DESCRIPTION OF THE DRAWINGS

The foregoing and other objects, aspects and advantages will be better understood from the following detailed description of a preferred embodiment of the invention with reference to the drawing, in which.

DETAILED DESCRIPTION OF A PREFERRED EMBODIMENT OF THE INVENTION

Figure 1:
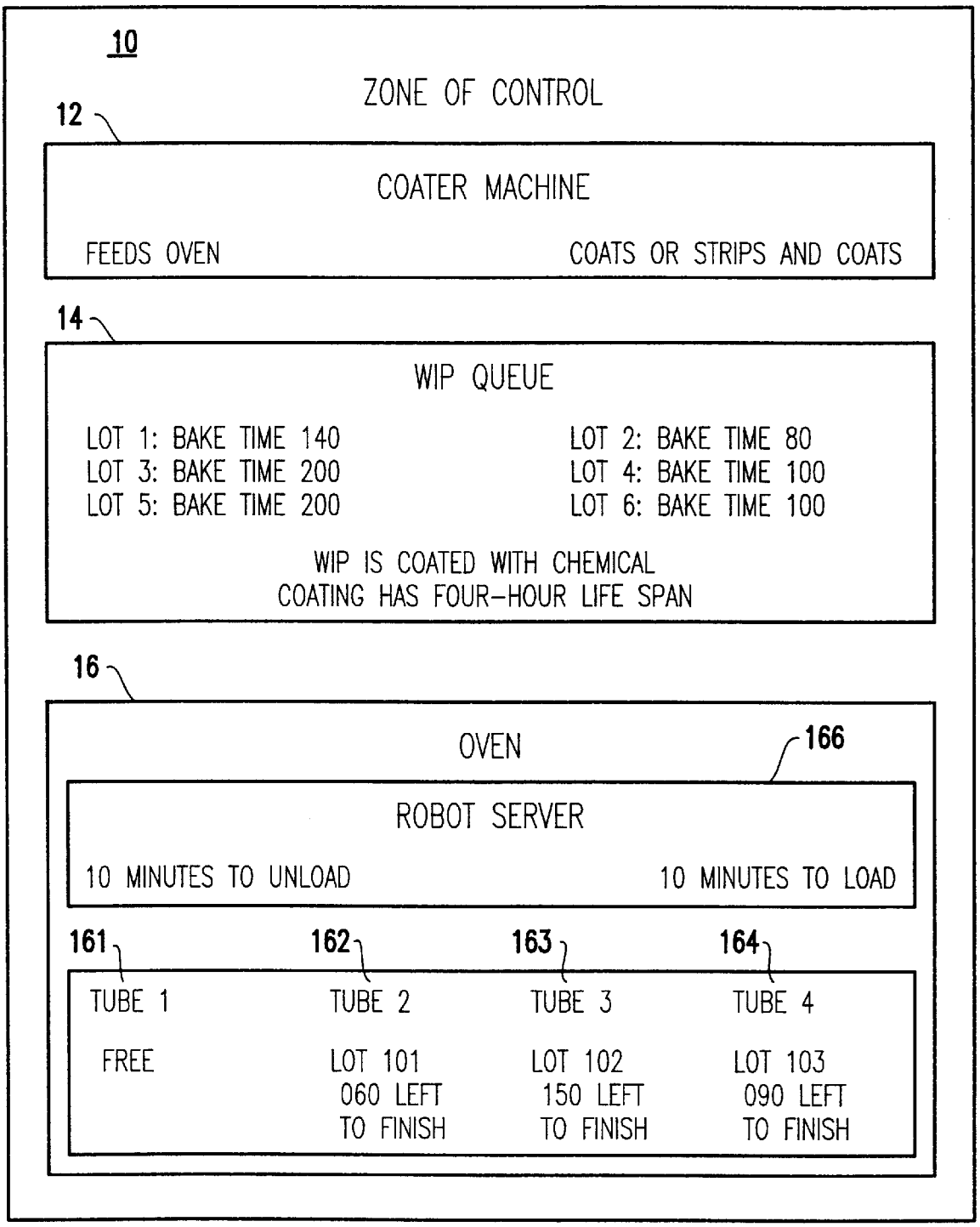
FIG. 1 is a block diagram of an oven dispatch example used to illustrate decision areas or tiers based on a planning horizon.
Figure 2:
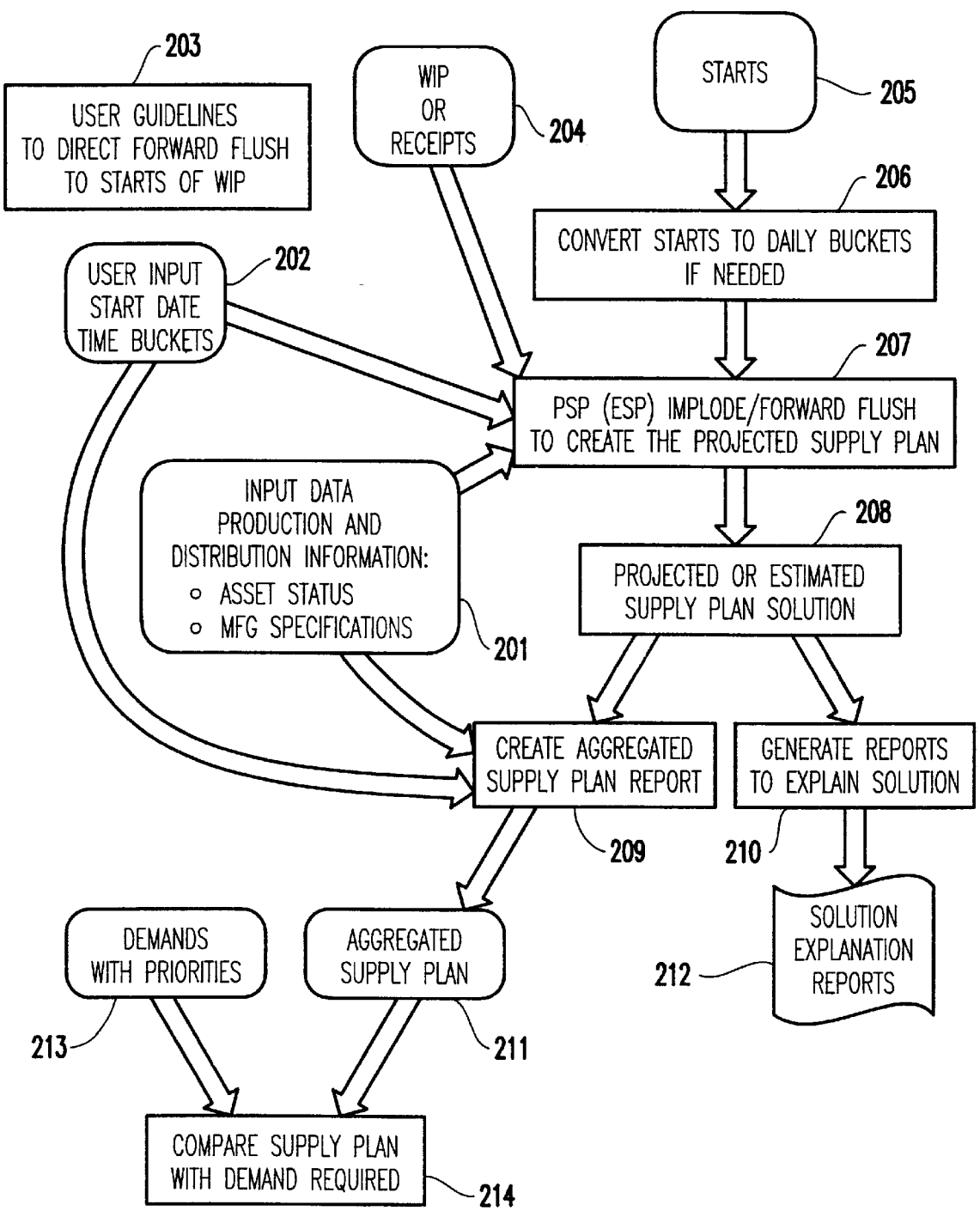
FIG. 2 is a block diagram showing the overall organization of the projected supply planning (PSP) matching decision-support tool according to the preferred embodiment of the invention.

Referring again to the drawings, and more particularly to FIG. 2, there is shown a block diagram of the overall organization of the projected supply planning (PSP) or estimated supply planning (ESP) asset and demand-matching decision-support tool according to a preferred embodiment of the invention. This tool has been implemented to run on a sixteen-way IBM SP2 machine with AFS for storage. The SP2 is a collection IBM RISC System/6000 engines running under a common umbrella and AIX operating system (IBM's version of the UNIX operating system) and connected with a high-speed switch. It could be implemented on other hardware platforms including, but not limited to, mini-computers, stand-alone UNIX or Windows NT workstations, or workstations in a network, or mainframes, including IBM AS400 and ES9000 computers.

There are four major stages in the PSP matching engine. Stage 1, from input blocks 201 and 204, is capturing the production specification (BOM, yields, inventory policy, etc.) and asset (receipts) information from existing production data bases. Stage 2, from input blocks 202, 203, and 205, is user input. Here, the user must specify in block 203 his or her guidelines to direct the forward flush, the starts in block 205, and the start date and the time buckets in block 202. Stage 3, processing blocks 206, 207, 208, 209, 210, 211, and 212, is the actual execution of the forward-flush algorithm and generation of the reports. Stage 4, output processing blocks 211, 213, and 214, is the analysis phase where the user compares the supply plan with the forecasted demand information.

The overall flow begins with capturing production specification information in block 201 and current asset or receipts information in block 204. This information is traditionally captured and stored on a regular basis by all manufacturing entities. The second step is having the user specify the guidelines to direct the forward-flush algorithm called the from/to guidance. In this step, the user specifies a split percentage or fraction when one part may be used to produce more than one other part. Using techniques from directed graphs well known to those practiced in the art, the user is provided a list of all from/to fractions that require specification. Details are provided later. The third step is the user specification of the starts in block 205 to be used by the forward-flush algorithm. This information is the anticipated starts the manufacturing facility expects to make over some period of time. Often this information is provided in time-bucket form. That is, the starts for every day, except shutdown days, during a period, say from May 21, 1997, to Jun. 15, 1997, will be, for example, thirty units. This time-bucket specification is converted in block 206 into a daily specification. The actual forward-flush solver is implemented in block 207. This solver uses the production specification information, WIP, STARTS, and user guidelines to create a projected or estimated supply plan with daily granularity and stores the answer in block 208. The daily projected supply plan is converted in block 209 into an aggregated supply plan, based on the time-bucket information provided by the user. This result is stored in block 211. Solution explanation reports are generated in block 210 and stored in block 212. In block 214, the user takes the aggregated projected supply plan stored in block 211 and compares it with the projected demand from block 213. After the comparison, the user may change some of the input data and rerun the forward-flush algorithm.

Figure 3:
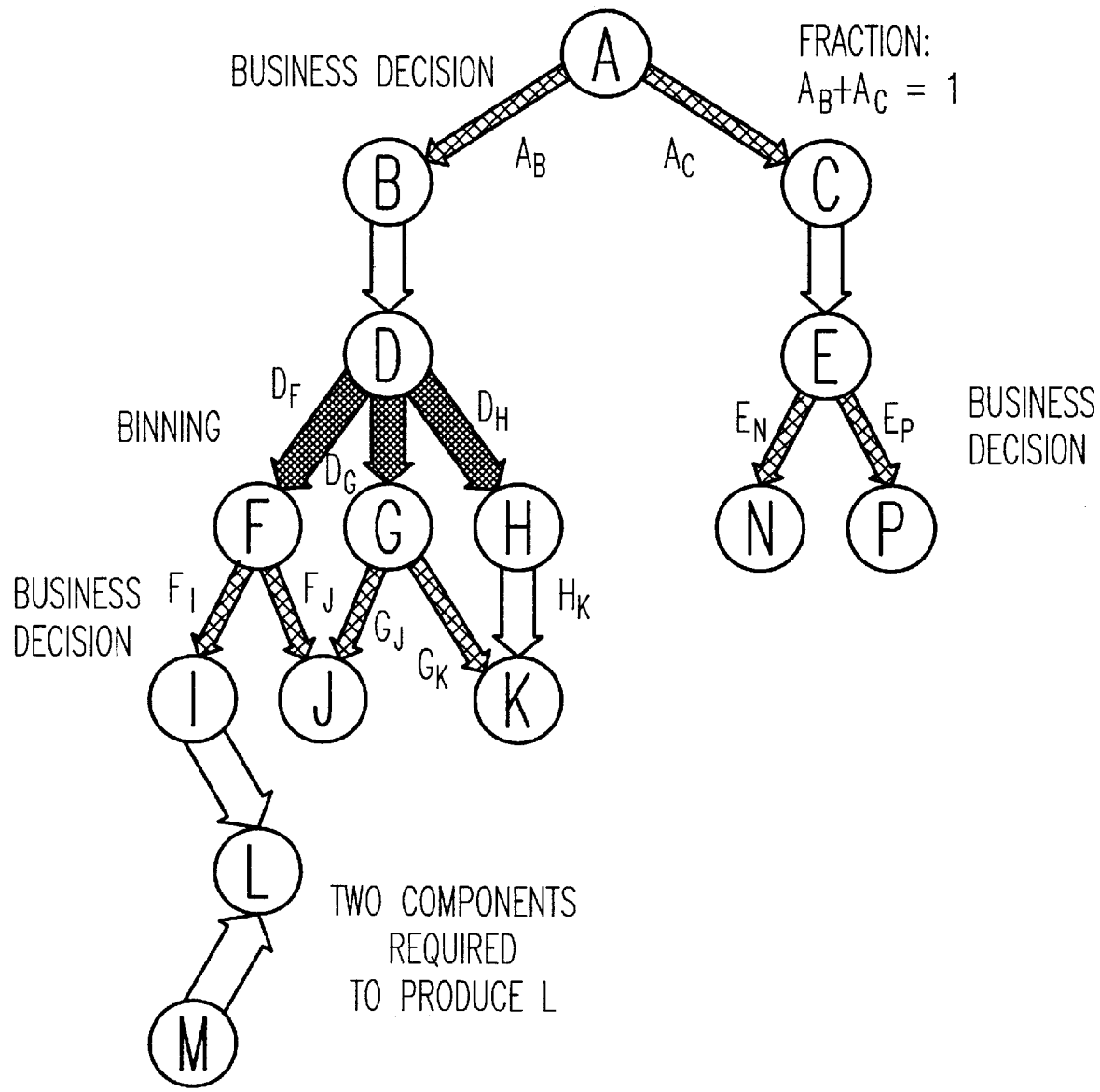
FIG. 3 is a block diagram of the typical product flow for a forward-flush supply plan.
Figure 4:
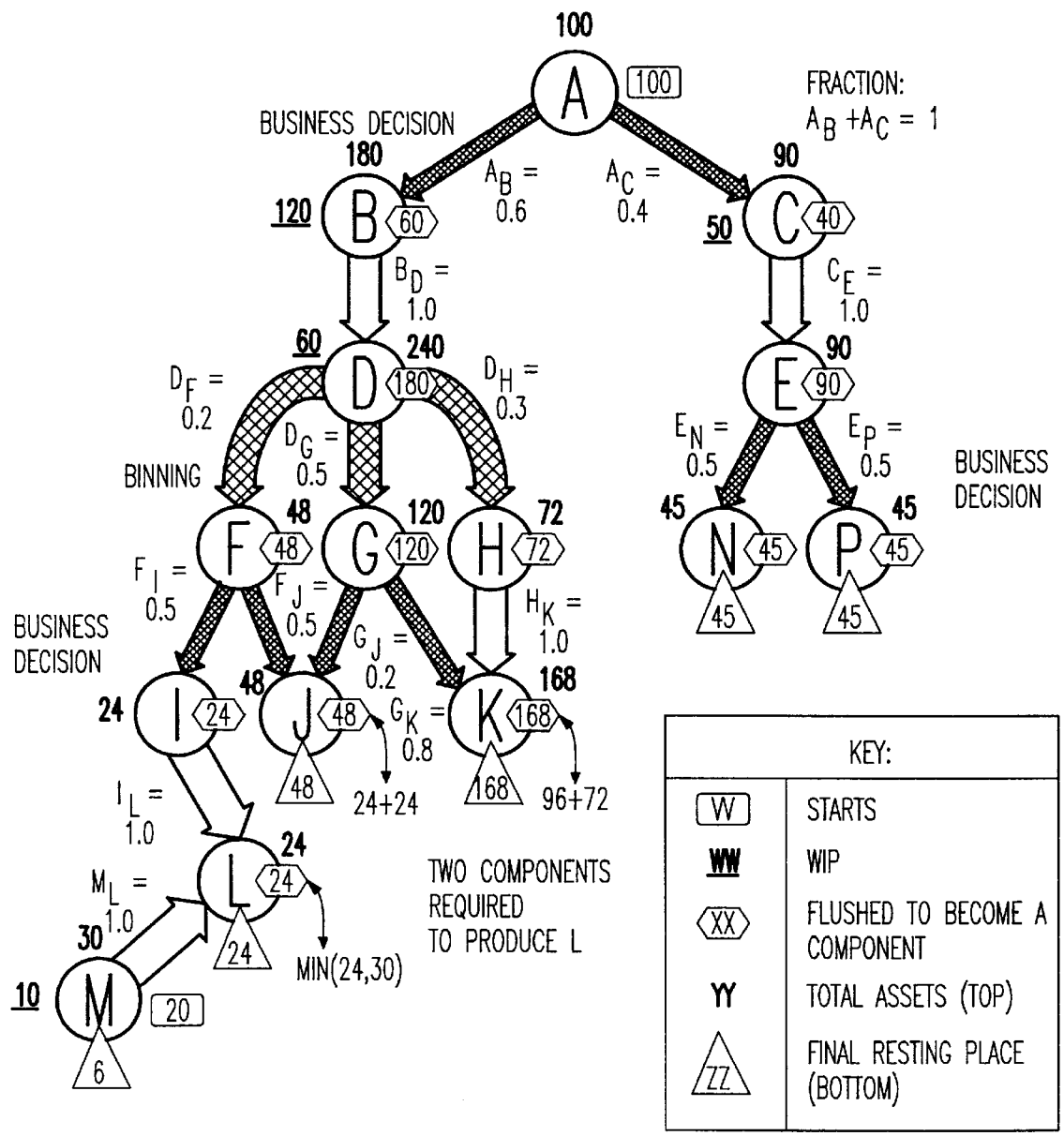
FIG. 4 is a block diagram of the typical product flow with specific values to serve as an example.

Referring now to FIG. 3 and FIG. 4, a typical forward flush through a complex production-specification path will now be described. FIG. 3 shows a typical product flow without specific values. FIG. 4 is the same flow as FIG. 3 but with specific values for the from/to split fractions, binning fractions, WIP, and STARTS. These values are used in the subsequent examples. Fractional values are identified by their form O.X. STARTS are identified by the curved corner rectangle that surrounds them. WIP is identified by their underline and their location to the left of the "part name circle." Values flushed to become a component part are identified by the "rectangular hexagon" that surrounds them. The total assets at a part before being flushed forward are identified by their location at the top of each "part name circle" and no other identifying mark. Total assets that remain at a part after the flush forward are identified by the triangle that surrounds them and their location at the bottom of each "part name circle."

The journey starts with Part A. After Part A is completed (i.e., the process required to produce Part A is completed), it may be used to either produce Part B, to produce Part C, or remain as Part A. That is, Part A is a required component to make Part B or Part C. For simplicity in the illustrated example, it is assumed that the component quantity is always one. The user defines what fraction of Part A is used to build Part B (this fraction is called $A_B$) and the fraction used to build Part C ($A_C$). If one hundred units of Part A are available and the split or from/to fractions are 0.60 and 0.40 respectively, then the forward-flush algorithm will allocate sixty units of Part A to be components to produce Part B and forty units of Part A to be components to produce Part C.

The journey now moves to Part C. The process to produce Part C has received forty units of Part A from the prior "flush" to build Part Cs. Since Part C has only one required component, Part A, and the component quantity is one, forty units of Part C can be produced from the forty units of Part A flushed forward. Additionally, the WIP file shows fifty units of Part C in WIP or projected receipts. Therefore, after these receipts come to stock and the Part As are converted to Part Cs, then the total available units of Part C is ninety.

The only part which uses Part C as a component part is Part E. Therefore, all ninety units of Part C are allocated to be components for the process to produce Part E. Essentially, all of the Part C parts become Part E parts. There is no WIP for Part E, so the total supply before forward-flush for Part E is ninety.

Part E may be used to either produce Part N or Part P. If the split fraction is 0.5 for each leg, then the forward-flush algorithm will allocate forty-five units of Part E to Part N and forty-five units to Part P. Parts N and P are end parts; that is, they are not components for any other part. Essentially, this is the final resting place for this leg of the forward flush.

Returning to Part B, we find there are one hundred twenty units in WIP and sixty units of Part A to be converted into sixty units of Part B. Therefore, the total supply of Part B is one hundred eighty (120+60) units before being flushed forward.

Part B can only be used to make Part D. We find there are two hundred forty units of Part D; one hundred eighty from Part B and sixty from the WIP file. Part D can become either Parts F, G or H. However, the split fraction is not a business decision, but a technical decision. This split represents a binning point. In the illustrated example, the binning fractions are 0.2, 0.5 and 0.3. Therefore, the forward flush calculates a component supply of forty-eight units for Part F, one hundred twenty units for Part G, and seventy-two units for Part H.

We now skip ahead to the production of Part L. The process which produces Part L requires two component parts, Part I and Part M. The component quantity for both parts is one. Therefore, the maximum number of units of Part L which can be produced is twenty-four. This is the minimum between the available supply for Part I (24) and Part M (30). Note Part M has twenty units that are starts and ten units that are WIP for a total of thirty units. Therefore, twenty-four units from both Part I and Part M are flushed to the process which produces Part L. Part L does not feed any other part; therefore, the final resting place for these twenty-four units is Part L. The six units that remained behind at M have this part as their final resting place. In this simple example, the projected supply plan is:

| Part | units of supply |
| --- | --- |
| N | 45 |
| P | 45 |
| K | 168 |
| J | 48 |
| L | 24 |
| M | 6 |

If the user desired more units of Part L, then he or she could simply either increase the value of $A_B$ or $F_I$ to increase the number of units of Part I that are available. He or she cannot change the value $D_F$, since this is a binning fraction and is not a business decision but established by the technical specifications of the manufacturing process. It should be noted that the maximum number of units of Part L possible for the supply plan is currently thirty, since there are only thirty units of Part M available.

The previous example illustrated the basic flow of the forward solver, but did not illustrate the mechanisms required to handle time, yields, conversion factors, component quantities, capacity, and shutdown days. The following extensions to our example will illustrate how to handle these additional requirements which provide the all-important parity with MRP.

The start date for this example is 19970701. The date is provided in the integer form YYYYMMDD, which eases certain aspects of date computation (for example, sorting). The relevant shutdown days are 19970704, 19970705, 19970720, and 19970727.

The following tables contain the date-effective cycle times, yields, conversion factors, capacity required, capacity available, and capacity priority for each manufacturing activity in our example; e.g., substitutions, STARTS, WIP, and reverse-low-level code.

Date-Effective Cycle Times

| process to produce part | cycle time in days | effective date |
|---|---|---|
| A | 2.00 | 19970701 |
| A | 1.00 | 19970706 |
| B | 4.00 | 19970701 |
| C | 5.00 | 19970701 |
| D | 3.00 | 19970701 |
| D | 2.40 | 19970715 |
| E | 4.60 | 19970701 |
| F | 1.00 | 19970701 |
| G | 1.00 | 19970701 |
| H | 1.00 | 19970701 |
| I | 2.10 | 19970701 |
| J | 2.00 | 19970701 |
| K | 3.00 | 19970701 |
| L | 3.00 | 19970701 |
| M | 1.00 | 19970701 |
| N | 2.10 | 19970701 |
| P | 3.80 | 19970701 |
| Q | 5.00 | 19970701 |

Date-Effective Yields

| process to produce part | yield values | effective date |
|---|---|---|
| A | 1.00 | 19970701 |
| B | 0.70 | 19970701 |
| B | 0.80 | 19970710 |
| C | 0.70 | 19970701 |
| C | 0.90 | 19970710 |
| D | 1.00 | 19970701 |
| E | 1.00 | 19970701 |
| F | 1.00 | 19970701 |
| G | 1.00 | 19970701 |
| H | 1.00 | 19970701 |
| I | 1.00 | 19970701 |
| J | 1.00 | 19970701 |
| K | 1.00 | 19970701 |
| L | 1.00 | 19970701 |
| M | 1.00 | 19970701 |
| N | 1.00 | 19970701 |
| P | 1.00 | 19970701 |
| Q | 1.00 | 19970701 |

Date-Effective Conversion Factors

| process to produce part | conversion factors | effective date |
|---|---|---|
| A | 1 | 19970701 |
| B | 1 | 19970701 |
| C | 1 | 19970701 |
| D | 10 | 19970701 |
| E | 20 | 19970701 |
| F | 1 | 19970701 |
| G | 1 | 19970701 |
| H | 1 | 19970701 |
| I | 1 | 19970701 |
| J | 1 | 19970701 |
| K | 1 | 19970701 |
| L | 1 | 19970701 |
| M | 1 | 19970701 |
| N | 1 | 19970701 |
| P | 1 | 19970701 |
| Q | 1 | 19970701 |

Date-Effective Component and Component Quantities

| process to produce part | consumed component | component quantity | effective date |
|---|---|---|---|
| A | — | 1 | 19970701 |
| B | A | 1 | 19970701 |
| C | A | 1 | 19970701 |
| D | BB | 1 | 19970701 |
| E | C | 1 | 19970701 |
| F | D | 1 | 19970701 |
| G | D | 1 | 19970701 |
| H | D | 1 | 19970701 |
| I | F | 1 | 19970701 |
| J process 1 | F | 1 | 19970701 |
| J process 2 | G | 1 | 19970701 |
| K process 1 | G | 1 | 19970701 |
| K process 2 | H | 1 | 19970701 |
| L | I | 1 | 19970701 |
| L | M | 1 | 19970701 |
| M | — | 1 | 19970701 |
| N | E | 1 | 19970701 |
| P | E | 1 | 19970701 |
| Q | — | 1 | 19970701 |
| BB | Q | 1 | 19970701 |
| DDD | — | 1 | 19970701 |
| MMM | — | 1 | 19970701 |

Date-Effective Capacity Required per Unit of Production and the Relative Priority of this Process to use the Capacity Available at this Tool (the lower the value, the higher the priority)

| process to produce part | capacity required | tool required | relative priority of this process (the lower the value, the higher the priority) | effective date |
|---|---|---|---|---|
| A | 1 | AA | 1 | 19970701 |
| B | 1 | BBCC | 1 | 19970701 |
| C | 1 | BBCC | 2 | 19970701 |
| D | 1 | DDEE | 2 | 19970701 |
| E | 1 | DDEE | 1 | 19970701 |
| F | 1 | FGH | 1 | 19970701 |
| G | 1 | FGH | 2 | 19970701 |
| H | 1 | FGH | 3 | 19970701 |
| I | 1 | IJK | 1 | 19970701 |
| J | 1 | IJK | 2 | 19970701 |
| K | 1 | IJK | 3 | 19970701 |
| L | 1 | LL | 1 | 19970701 |
| M | 1 | MM | 1 | 19970701 |

-continued

Date-Effective Capacity Required per Unit of Production and the Relative Priority of this Process to use the Capacity Available at this Tool (the lower the value, the higher the priority)

| process to produce part | capacity required | tool required | relative priority of this process (the lower the value, the higher the priority) | effective date |
|---|---|---|---|---|
| N | 1 | NNPP | 1 | 19970701 |
| P | 1 | NNPP | 1 | 19970701 |

Date-Effective Capacity Available per day

| tool | capacity available per day | effective date |
|---|---|---|
| AA | 1000000 | 19970701 |
| BBCC | 1000000 | 19970701 |
| DDEE | 80 | 19970701 |
| DDEE | 10000 | 19970703 |
| FGH | 1000000 | 19970701 |
| IJK | 1000000 | 19970701 |
| LL | 1000000 | 19970701 |
| MM | 1000000 | 19970701 |
| NNPP | 1000000 | 19970701 |

Part Number Substitution

| part number to be used as a replacement | part number that can have a substitute | component quantity | effective date |
|---|---|---|---|
| DDD | D | 1 | 19970701 |
| MMM | M | 1 | 19970701 |
| B | BB | 1 | 19970701 |

This last table states:

(1) if a manufacturing operation requires one unit of part D, then one unit of part DDD can be used instead of the one unit of part D effective 7/1/1997;

(2) if a manufacturing operation requires one unit of part M, then one unit of part MMM can be used instead of the one unit of part M effective 7/1/1997; and (3) if a manufacturing operation requires one unit of part BB, then one unit of part B can be used instead of the one unit of part BB effective 7/1/1997.

USER INPUT STARTS

| Part | Quantity | Date |
|---|---|---|
| A | 20 | 19970701 |
| A | 10 | 19970702 |
| A | 40 | 19970706 |
| A | 30 | 19970712 |
| M | 20 | 19970719 |

WIP (projected receipts) and Inventory

| Part | Quantity | Date |
|---|---|---|
| B | 40 | 19970701 |
| B | 60 | 19970703 |
| B | 20 | 19970708 |
| C | 50 | 19970701 |
| D | 20 | 19970708 |
| DDD | 40 | 19970712 |
| MMM | 10 | 19970715 |

Reverse-low-level Code

| process to produce part | low-level code values |
|---|---|
| DDD | 1 |
| MMM | 1 |
| A | 1 |
| B | 2 |
| C | 2 |
| BB | 2 |
| D | 3 |
| E | 3 |
| F | 4 |
| G | 4 |
| H | 4 |
| I | 5 |
| J | 5 |
| K | 5 |
| L | 6 |
| M | 1 |
| N | 4 |
| P | 4 |
| Q | 1 |

A part number has reverse-low-level code (RLLC) of one if it has no components. A part number has RLLC of two if it has components and none of which have RLLC greater than one and at least one of which has an RLLC of one. A part number has RLLC of three if it has components and none of which have RLLC greater than two and at least one of which has an RLLC of two, etc. In general, a part has RLLC of N if it has no component parts with RLLC greater than N−1 and it has at least one component with RLLC of N−1. The lower the value of the RLLC the lower the part is on the supply chain. Alternatively, the RLLC may be stored in reverse order. The higher the value the lower on the supply chain.

The first step is to develop an initial asset list for each part. In our example, initial assets are the projected date to stock for each START and the projected receipts or WIP. The projected stock quantity is calculated by multiplying the start quantity by the appropriate yield and conversion factor. The projected stock date is calculated by adding the appropriate cycle time to the start date and adjusting for any shutdown dates. The stock quantity and date for each START is provided in the following table:

STARTS with STOCK DATE and QUANTITY

| Part | START quantity | START date | STOCK quantity | STOCK date |
|---|---|---|---|---|
| A | 20 | 19970701 | 20 =1 × 1 × 20 | 19970703 19970701 + 2 |
| A | 10 | 19970702 | 10 | 19970706 19970702 + 2 = 19970704 this is moved to first non-shutdown day = 19970706 |
| A | 40 | 19970706 | 40 | 19970707 |
| A | 30 | 19970712 | 30 | 19970713 |
| M | 20 | 19970719 | 20 | 19970721 note: 19970720 is a shutdown date |

The calculated stock for each start is combined with the projected receipt or WIP to create a current assets table. As a final step, the part substitution rules are deployed by renaming an asset where appropriate for parts with RLLC of one. For example, part DDD has a projected receipt date of 19970712 for forty units. The substitution table shows part DDD can be substituted for part D. Therefore, the asset is "renamed" to part D.

Current Assets Reflecting RLLC 1 Starts
(projected stock date for starts and projected receipts)

| Part | Quantity | Date |
|---|---|---|
| A | 20 | 19970703 |
| A | 10 | 19970706 |
| A | 40 | 19970707 |
| A | 30 | 19970713 |
| B | 40 | 19970701 |
| B | 60 | 19970703 |
| B | 20 | 19970708 |
| C | 50 | 19970701 |
| D | 20 | 19970708 |
| D* | 40 | 19970712 |
| M* | 10 | 19970715 |
| M | 20 | 19970721 |

* indicates this initial asset is a result of the substitution rules.

Next, we record all of the starts into the manufacturing release table, which has a log of all starts with pertinent information:

Manufacturing Release File
(log of all starts)

| Part | START quantity | START date | STOCK quantity | STOCK date |
|---|---|---|---|---|
| A | 20 | 19970701 | 20 | 19970703 |
| A | 10 | 19970702 | 10 | 19970706 |
| A | 40 | 19970706 | 40 | 19970707 |
| A | 30 | 19970712 | 30 | 19970713 |
| M | 20 | 19970719 | 20 | 19970721 |

Next, we allocate the projected stock quantities for parts with reverse-low-level code of 1 (Parts A and M) to become component parts to produce other parts further down the supply chain. For example, on 19970703, twenty units of Part A come to stock. From FIG. 4 we know 0.60 of these units are allocated to be component parts for Part B and 0.40 of these units are allocated to be component parts for Part C. Therefore, on 19970703, twelve units of Part A are sent to the process which produces Part B and 8 units are sent to the process which produces Part C. This information is recorded in the stock distribution table:

Stock Distribution Table (allocation parts to be component parts) entries for RLLC 1

| From Part | To Part | Date | quantity |
|---|---|---|---|
| A | B | 19970703 | 12 0.6 × 20 |
| A | C | 19970703 | 8 0.4 × 20 |
| A | B | 19970706 | 6 |
| A | C | 19970706 | 4 |
| A | B | 19970707 | 24 |
| A | C | 19970707 | 16 |
| A | B | 19970713 | 18 |
| A | C | 19970713 | 12 |
| M | L | 19970715 | 10 |
| M | L | 19970721 | 20 |

Next, we determine all possible starts for reverse-low-level code 2 parts and calculate their stock date and stock quantity. For example, the arrival of twelve units of Part A as components to the process to produce Part B on 19970703 permits a start of twelve units of Part B to begin that day. The stock quantity for this start will be 8.4 units (12×0.7×1). The stock date will be 19970709 (19970703+4 cycle time days+2 shutdown days). This information is added to the manufacturing release file. The revised manufacturing release file is provided below:

Manufacturing Release File
(log of all starts-second revision)

| Part | START quantity | START date | STOCK quantity | STOCK date |
|---|---|---|---|---|
| A | 20 | 19970701 | 20 | 19970703 |
| A | 10 | 19970702 | 10 | 19970706 |
| A | 40 | 19970706 | 40 | 19970707 |
| A | 30 | 19970712 | 30 | 19970713 |
| M | 20 | 19970719 | 20 | 19970721 |
| B | 12 | 19970703 | 8.4 =0.7 × 1 × 12 | 19970709 =19970703 + 4 =19970707 but two shutdown days must be adjusted for =19970703 + 4 + 2 |
| B | 6 | 19970706 | 4.2 | 19970710 |
| B | 24 | 19970707 | 16.8 | 19970711 |
| B | 18 | 19970713 | 14.4 =0.8 × 1 × 18 | 19970717 19970717 |
| C | 8 | 19970703 | 5.6 | 19970710 |
| C | 4 | 19970706 | 2.8 | 19970711 |
| C | 16 | 19970707 | 11.2 | 19970712 |
| C | 12 | 19970713 | 10.8 | 19970718 |

Next, the asset file must be revised to reflect the "loss" of part A assets (they were consumed in the production of parts B and C) and the creation of new part B and C assets:

| Current Assets Reflecting RLLC 2 starts (projected stock date for starts and projected receipts) | | |
|---|---|---|
| Part | Quantity | Date |
| B | 8.40 | 19970709 |
| B | 4.20 | 19970710 |
| B | 16.80 | 19970711 |
| B | 14.40 | 19970717 |
| B | 40.00 | 19970701 |
| B | 60.00 | 19970703 |
| B | 20.00 | 19970708 |
| C | 5.60 | 19970710 |
| C | 2.80 | 19970711 |
| C | 11.20 | 19970712 |
| C | 10.80 | 19970718 |
| C | 50.00 | 19970701 |
| D | 20.00 | 19970708 |
| D | 40.00 | 19970712 |
| M | 10.00 | 19970715 |
| M | 20.00 | 19970721 |

Next, the asset file is revised to reflect any substitution rules that need to be invoked and appropriately rename the asset. The substitution table shows part B can be substituted for part BB. The component or bill of material file shows no part which requires B as a component part. As a result we rename all of the B parts to be BB parts. The asset file now looks as follows:

| Current Assets Reflecting RLLC 2 Starts With Substitution Rules | | |
|---|---|---|
| Part | Quantity | Date |
| BB | 8.40 | 19970709 |
| BB | 4.20 | 19970710 |
| BB | 16.80 | 19970711 |
| BB | 14.40 | 19970717 |
| BB | 40.00 | 19970701 |
| BB | 60.00 | 19970703 |
| BB | 20.00 | 19970708 |
| C | 5.60 | 19970710 |
| C | 2.80 | 19970711 |
| C | 11.20 | 19970712 |
| C | 10.80 | 19970718 |
| C | 50.00 | 19970701 |
| D | 20.00 | 19970708 |
| D | 40.00 | 19970712 |
| M | 10.00 | 19970715 |
| M | 20.00 | 19970721 |

Next, we allocate the projected stock quantities for parts with reverse-low-level code of 2 (Parts BB and C) to become component parts to produce other parts further down the supply chain. For example, on 19970701, forty units of Part BB come to stock from the projected WIP input table. From FIG. 4, we know 1.00 (all) of these units are allocated to be component parts for Part D. Therefore, on 19970701, 40 units of Part BB are sent to the process which produces Part D. This information is recorded in the stock distribution table. Note we have put the stock distribution in part number and then date order:

| Stock Distribution Table (allocation parts to be component parts) Entries for RLLC 2 | | | |
|---|---|---|---|
| From Part | To Part | Date | quantity |
| BB | D | 19970701 | 40 |
| BB | D | 19970703 | 60 |
| BB | D | 19970708 | 20 |
| BB | D | 19970709 | 8.4 |
| BB | D | 19970710 | 4.2 |
| BB | D | 19970711 | 16.8 |
| BB | D | 19970717 | 14.4 |
| C | E | 19970701 | 50 |
| C | E | 19970710 | 5.6 |
| C | E | 19970711 | 2.8 |
| C | E | 19970712 | 11.2 |
| C | E | 19970718 | 10.8 |

Next, we determine all possible starts for reverse-low-level code 3 parts and calculate their stock date and stock quantity. For example, the arrival of forty units of Part BB as components to the process to produce Part D on 19970701 permits a start of forty units of Part D to begin that day. The arrival of fifty units of Part C as components to Part E permits a start of fifty units of Part E to begin that day. However, capacity is limited on the tool (DDEE) which must be used to produce Part D or Part E. There are only 80 units available on 19970701 and the process to produce Part E has pre-emptive priority. As a result, fifty units of Part E and thirty units of Part D will be started on 19970701. The ten (40−30) "carryover" units of Part D starts, for which there are components but not capacity, will be started on the next work day (no shutdown days) where there is sufficient capacity (available and not claimed by the process to produce Part E). A partial start is permitted. In our example, there is sufficient capacity available on 19970702 to permit all ten units of "carryover" starts for Part D to begin. The fifty units of Part E will come to stock on 19970707.6 (19970701+4.6=19970705.6 plus a two day adjustment for the two shutdown days of 19970704 and 19970705) with a quantity of one thousand (50×1×20 where 20 is the conversion factor). The thirty units of Part D will come to stock on 19970706 (19970701+3=19970704, this is a shutdown day, so stock date is the next regular work day=19970706) with a quantity of three hundred (30×1×10). The ten units of Part D started on 19970702 will come to stock on 19970707 with a quantity of one hundred. All starts are recorded in the manufacturing release file. The table below has just the new entries for starts for Part D and Part E:

| Manufacturing Release File (log of all starts-third revision) only showing additions for Part D and E | | | | |
|---|---|---|---|---|
| | START | | STOCK | |
| Part | quantity | date | quantity | date |
| D | 30 | 19970701 | 300 | 19970706 |
| D | 10 | 19970702 | 100 | 19970707 |
| D | 60 | 19970703 | 600 | 19970708 |
| D | 20 | 19970708 | 200 | 19970711 |
| D | 8.4 | 19970709 | 84 | 19970712 |
| D | 4.2 | 19970710 | 42 | 19970713 |
| D | 16.8 | 19970711 | 168 | 19970714 |
| D | 14.4 | 19970717 | 144 | 19970719.4 cycle time is now 2.4 |
| E | 50 | 19970701 | 1000 | 19970707.6 |
| E | 5.6 | 19970710 | 112 | 19970714.6 |

-continued

Manufacturing Release File (log of all starts-third revision) only showing additions for Part D and E

| Part | START | | STOCK | |
|------|-------|------|-------|------|
|      | quantity | date | quantity | date |
| E | 2.8 | 19970711 | 56 | 19970715.6 |
| E | 11.2 | 19970712 | 224 | 19970716.6 |
| E | 10.8 | 19970718 | 216 | 19970723.6 |
|   |      |          |     | 19970720 shutdown day |

Next, the asset file must be revised to reflect the "loss" of Part BB and C assets (they were consumed in the production of Part D and Part E) and the creation of new Part D and E assets.

Current Assets Reflecting RLLC 3 Starts
(projected stock date for starts and projected receipts)

| Part | Quantity | Date |
|------|----------|------|
| D | 300.00 | 19970706 |
| D | 100.00 | 19970707 |
| D | 600.00 | 19970708 |
| D | 200.00 | 19970711 |
| D | 84.00 | 19970712 |
| D | 42.00 | 19970713 |
| D | 168.00 | 19970714 |
| D | 144.00 | 19970719.4 |
| E | 1000.00 | 19970707.6 |
| E | 112.00 | 19970714.6 |
| E | 56.00 | 19970715.6 |
| E | 224.00 | 19970716.6 |
| E | 216.00 | 19970723.6 |
| D | 20.00 | 19970708 |
| D | 40.00 | 19970712 |
| M | 10.00 | 19970715 |
| M | 20.00 | 19970721 |

The process as illustrated continues until all of the reverse-low-level codes are exhausted.

Figure 5:
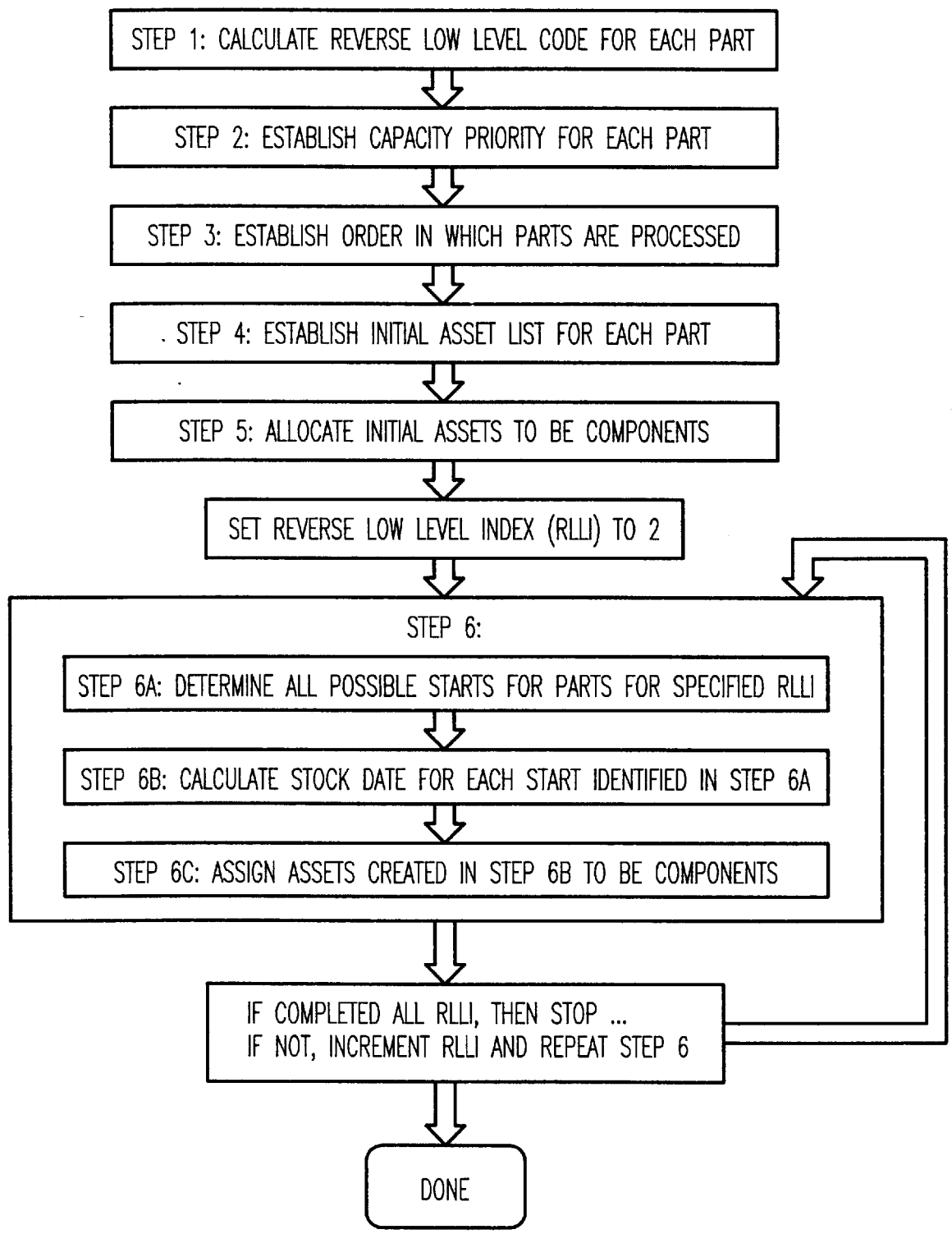
FIG. 5 is a flow diagram showing the major steps in the forward-flush algorithm.

Referring now to FIG. 5, there is shown a flow diagram of the generic flow of the forward-flush or implode solver which executes a deterministic simulation of moving assets "forward," based on the production specification information to create the projected supply plan.

Step 1 is to calculate the reverse-low-level-code (RLLC) for each part number. A part number has RLLC of one if it has no components. A part number has RLLC of two if it has components none of which have RLLC greater than one. A part number has RLLC of three if it has a component whose RLLC is two and the part number has no components whose RLLC is greater than two, and so forth. In general, a part has RLLC of N if it has no component parts with RLLC greater than N−1 and it has at least one component with RLLC of N−1.

Step 2 is to retrieve the relative priority of each part (actually, the process of producing the part) access or option on capacity. This is an input from the user. The priority is established by using positive integers in an ordinal scale, where 1 is the highest priority.

Step 3 is to establish the order in which parts are processed by the forward-flush or implode solver. The order is ascending order of low-level code and within the same low level in ascending order of the "capacity" priority.

Step 4 is to establish the "initial" asset list for each part. There are three types of initial assets: inventory, projected receipts or WIP, and user-inputted starts. The list has three elements: part ID, quantity, and the earliest date this quantity for this part is available. This date is called the supply date. For inventory, the supply date is the user-inputted start date for the specific run of the PSP tool. For receipts or WIP, the stock date is the projected stock date that is associated with each WIP lot. This date is part of the data pulled from feeder systems and can be modified by the user. The supply date for each start is computed by calculating the projected stock date and quantity for each start using cycle time, yields, conversion factors, capacity available, and shutdown calendars in the traditional fashion known to all those who are practiced in the art. If insufficient capacity is available on the inputted start date, then the start is split into two quantities. Quantity NOW is the quantity for which there is sufficient capacity available for this manufacturing activity; quantity LATER is the quantity that is delayed until the first day there is at least some available capacity. The splitting of the start can be repeated on each day there is some available capacity for the specific part until the entire start actually begins production and is assigned a stock date. Additionally, all appropriate substitution rules are followed for parts with reverse-low-level code of 1 by renaming an asset to its "substitution for" part name.

Step 5 is to allocate the projected supplies or assets for reverse-low-level code 1 parts to be component supplies, based on the binning and from/to information for downstream parts (actually, manufacturing processes). In our prior example, Part A is component part for both Parts B and C. The split or from/to fraction of 0.60 goes to Part B and 0.40 goes to Part C. The component availability date is the same as its supply date.

Step 6A is to determine all possible starts over time for parts (actually, manufacturing processes to produce these parts) that are in the category of reverse-low-level code 2. By comparing the available component quantities against the component requirement values (required to produce the part), a list of all possible starts by day by part is created for all parts in the reverse-low-level code of 2.

Step 6B is to calculate a stock date for each possible start identified in Step 6A. The order in which stock dates are calculated for starts is based on the capacity priority and date. All starts with capacity priority 1 are processed first, in ascending date order. Then all starts with capacity priority of 2, etc. The actual stock date or supply date is computed by calculating the projected stock date and quantity for each start using cycle time, yields, conversion factors, capacity available, and shutdown calendars in the traditional fashion known to all those who are practiced in the art. If insufficient capacity is available on the inputted start date, then the start is split into two quantities: quantity NOW is the quantity for which there is sufficient capacity available for this manufacturing activity; quantity LATER is the quantity that is delayed until the first day there is at least some available capacity. The splitting of the start can be repeated on each day that there is some available capacity for the specific part, until the entire start actually begins production and is assigned a stock date. After this is completed a revised asset list is established and the appropriate substitutions rules are invoked by changing the name of the asset.

Step 6C is to allocate the projected supplies or assets for parts in reverse-low-level code 2 to be component supplies, based on the binning and from/to information for downstream parts (actually, manufacturing processes). In our prior example, Part C is a component for only Part E. The split or from/to fraction of 100 goes to Part E. The component availability date is the same as its supply date.

Steps 6A, 6B, and 6C are repeated for parts in reverse-low-level code of 3, then 4, etc., until all categories are exhausted.

The final result of the forward-flush solver is that the final disposition or resting place of all assets after flushed as far forward, stored as quantity, part, and date; a list of all starts (manufacturing releases) with both start and stock date and quantity; and "log tables" (for example, from/to or splitting actions and intermediate asset levels) which are the basis of the Explain reports.

The solution generated in block 207 of FIG. 2 and stored in block 208 is used in block 209 to create aggregated supply and manufacturing start or release reports for the user (block 211). The reports typically aggregate by time bucket or part number group. The mechanism to create such reports is well known to those practiced in the art.

The aggregated supply plans from block 211 are then down-loaded by the user to his or her analysis tool of choice to compare in block 214 with the current demand requirements from block 213.

In block 210, the logs and manufacturing release table are used to create core explanation reports to ensure that the user understands the solution and the appropriate sensitivity information. For example, the user is provided various reports on starts, capacity consumed, capacity required, and intermediate stocking levels. The method of creating such reports is well known to those practiced in the art.

Figure 6:
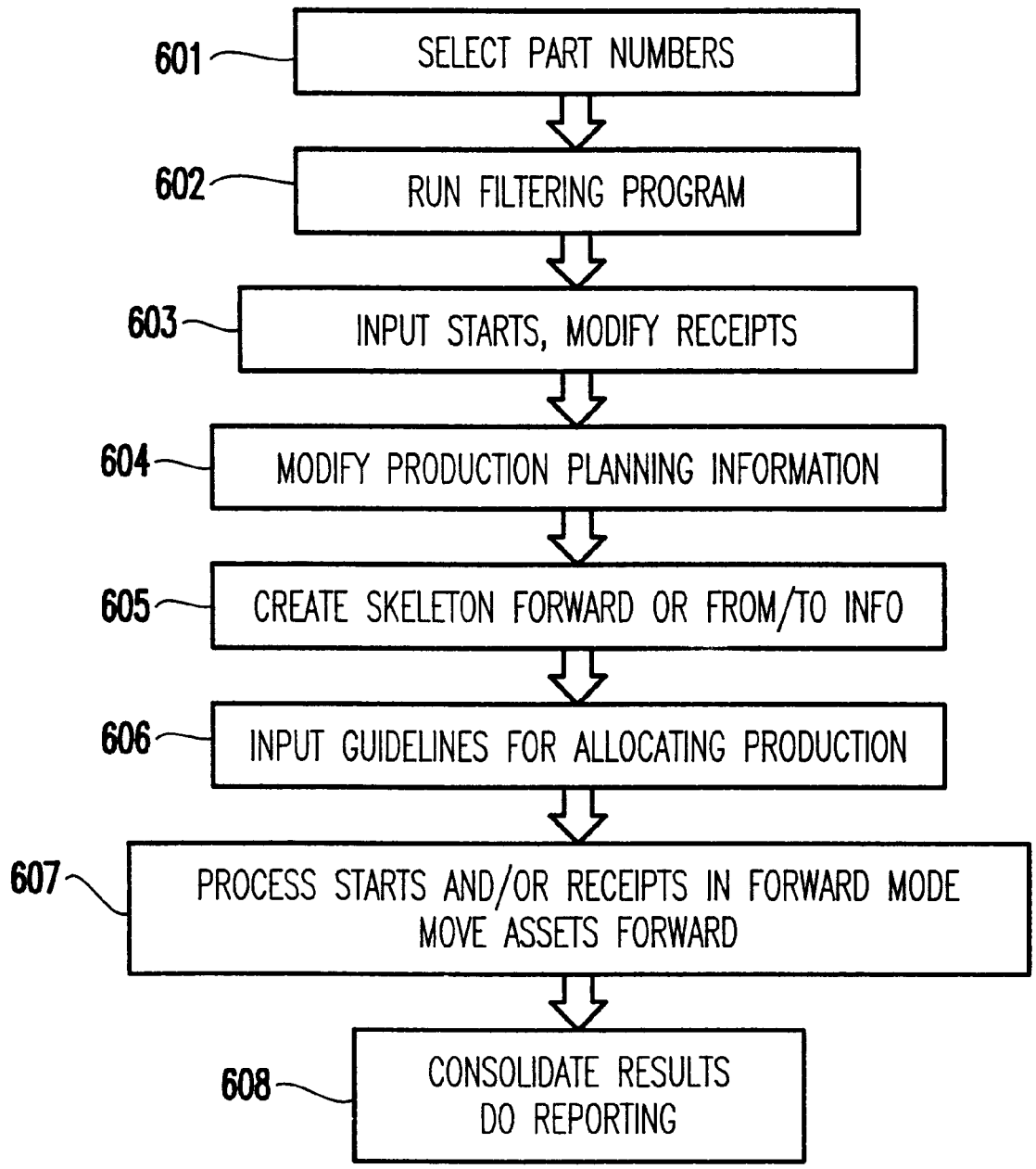
FIG. 6 is a flow diagram of a typical sequence that a user would execute in using the PSP tool according to the invention to assist with the development of a supply plan.

FIG. 6 is a flow diagram of a typical sequence of events that a user would execute in using the PSP tool to assist with the development of a supply plan. The solution process flow begins in block 601 by selecting part numbers. A filtering program is run at block 602, and then STARTS are input and receipts modified at block 603. Next, production planning information is modified in block 604. A skeleton of forward or from/to information is crated in block 605. Guidelines for allocation planning are input at block 606. STARTS and/or receipts are processed in forward mode and assets are moved forward in block 607. Finally, the results are consolidated and reports output in block 608.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented decision-support method to generate a projected supply planning (PSP) or estimated supply planning (ESP) match between existing assets and demands within boundaries established by manufacturing specifications and process flows and business policies using manufacturing specification and calendar information accessed by material requirements planning (MRP) matching tools to ensure synchronization between these matching tools to determine what supply can be provided over what time-frame, the method comprising the steps of:

selecting user provided part numbers of interest and modifying a user provided production specification information to reflect this selection;

specifying substitution rules, wherein the substitution rules allow one part to be substituted for another part;

specifying a start date and shutdown dates;

optionally allowing a user to modify any due dates for projected receipts;

specifying a "from/to" split of allocation fractions to reflect business plans, and to allow the projection of assets across multiple bills of material levels;

selectively inputting new starts for an individual date and dates propagated across a span of dates;

executing a forward-flush solver to generate a projected or estimated supply plan;

aggregating the supply plan and required starts into user-defined time buckets;

creating and analyzing explanation reports of the solution generated by the forward flush solver; and comparing the supply plan with the required demands to assess a "fitness" of the plan relative to meeting demand.

2. The computer-implemented decision-support method as recited in claim 1, wherein said method further comprising the steps of:

optionally permitting the user to modify the receipt date for each work in progress (WIP) unit;

evaluating a current receipt date for each WIP unit and modifying the receipt date as necessary; and evaluating a current receipt date for each WIP unit with a current status of manufacturing and modifying the receipt date as necessary.

3. The computer-implemented decision-support method as recited in claim 1 further comprising the steps of:

optionally permitting the user to specify future starts;

specifying a start quantity for a part number for one day;

specifying a start quantity for a part number for a range of days; and propagating the start quantity to each work day.

4. The computer-implemented decision-support method as recited in claim 1, wherein said method further comprising the steps of:

identifying all "from/to" part number relationships;

inputting default splitting fractions that generate a uniform distribution; and permitting the user to optionally modify the from/to splitting of allocation fractions.

5. The computer-implemented decision-support method as recited in claim 1, wherein said method performs a PSP forward-flush solution and further comprises the steps of:

calculating a reverse-low-level-code (RLLC) for each part number;

establishing a relative priority of each part, or process to produce a part, within a specific RLLC group using the user-specified priority values;

establishing an order in which parts are processed in forward flush where the order is based on ascending RLLC and ascending order within the RLLC group;

calculating a stock quantity and date for each user-specified start by appropriately applying yield, conversion factor, capacity, cycle time, and shutdown day list;

establishing an initial asset list from inventory, projected receipts, and calculated stock quantity and date for user-specified starts for each part consisting of part identification, quantity, and stock date;

applying substitution rules for parts with RLLC of one by changing its part number or name to the substitute for part name;

allocating the projected supplies or assets for parts in RLLC group one to be component supplies to produce other parts, based on user-specified "from/to" split of allocation fractions and bin split information;

determining all possible starts over time for parts or the process to produce the part that belong to RLLC group two by comparing available component supplies or quantities against component requirement values;

updating current asset list, adjusting for the parts in RLLC group one that were consumed and the parts in RLLC group two that were created, and then applying substitution rules for parts with RLLC of two and greater and repeating the steps of allocating, determining, calculating and updating until all RLLCs have been exhausted; and creating a manufacturing release or start, final asset resting place, intermediate asset position, and allocation file.

6. The computer-implemented decision-support method as recited in claim 1, wherein said method includes a step of aggregating final supply by user-specified time buckets.

7. The computer-implemented decision-support method as recited in claim 1, wherein said method includes a step of aggregating all required manufacturing releases or starts by user-specified time buckets.

* * * * *